US008315998B1

(12) United States Patent
Dean (10) Patent No.: US 8,315,998 B1
(45) Date of Patent: Nov. 20, 2012

(54) METHODS AND APPARATUS FOR FOCUSING SEARCH RESULTS ON THE SEMANTIC WEB

(75) Inventor: Michael Anthony Dean, Liberty Lake, WA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 793 days.

(21) Appl. No.: 10/803,551

(22) Filed: Mar. 18, 2004

Related U.S. Application Data (60) Provisional application No. 60/465,925, filed on Apr. 28, 2003.

(51) Int. Cl.
*G06F 17/30* (2006.01)
(52) U.S. Cl. ........................................ 707/705; 707/715
(58) Field of Classification Search .................. 707/5, 3, 707/705, 715
See application file for complete search history.

(56) References Cited

U.S. PATENT DOCUMENTS

| | | | | |
|---|---|---|---|---|
| 5,940,821 A | * | 8/1999 | Wical | 707/3 |
| 5,953,718 A | * | 9/1999 | Wical | 707/5 |
| 6,038,560 A | * | 3/2000 | Wical | 707/5 |
| 6,460,034 B1 | * | 10/2002 | Wical | 707/5 |
| 6,925,457 B2 | * | 8/2005 | Britton et al. | 1/1 |
| 2005/0055345 A1 | * | 3/2005 | Ripley | 707/3 |

* cited by examiner

*Primary Examiner* — Hung Q Pham (57) ABSTRACT

Methods and apparatus for searching Semantic Web structured resources and presenting the search results to a user can increase the likelihood that the search can produce meaningful results. An index database can be constructed by parsing literal values from statements from the resources to obtain component words of the literal values, with the index relating the component words to the statements from which they were parsed. A search engine can obtain component words from the database that match search terms in a query prepared by the user and can obtain the related statements for the matching words. A servlet or other application using the search engine and database can obtain predicates, instances, types of said instances, and full literal values of said instances for the related statements. The search results can be presented to the user as a summary of the predicates, instances, types, and full literal values.

15 Claims, 5 Drawing Sheets

METHODS AND APPARATUS FOR FOCUSING SEARCH RESULTS ON THE SEMANTIC WEB

RELATED APPLICATIONS

This application claims priority to, and incorporates by reference, the entire disclosure of U.S. Provisional Patent Application No. 60/465,925, filed on Apr. 28, 2003. This application is co-pending with a related patent application entitled "Methods and Apparatus for Representing, Using and Displaying Time-Varying Information on the Semantic Web" 10/806,406, by the same inventor and having assignee in common, filed concurrently herewith and incorporated by reference herein in its entirety.

GOVERNMENT INTEREST

This disclosed methods and systems were developed pursuant to Defense Advanced Research Projects Agency (DARPA) contract number F30602-00-C-0178. The U.S. Government may have rights in the disclosed methods and systems.

FIELD

The methods and apparatus relate to web searches, and more particularly to methods and apparatus for using the structure of information in the Semantic Web to increase the likelihood that a search produces meaningful results.

BACKGROUND

The Semantic Web is an evolving collection of knowledge, which provides information on the Internet, or World Wide Web in such a way that it can be readily used by intelligent agents and other computer programs. Information on the Semantic Web, rather than being in natural language text, can be maintained in a structured that both computers and people can work with. The Resource Description Framework (RDF) from the World Wide Web Consortium (W3C) underlies most Semantic Web efforts. RDF consists of statements (subject/predicate/object triples) made about instances of specific classes (similar to an object-oriented programming language).

The Resource Description Framework (RDF) is a general framework for how to describe an Internet resource such as a Web site and its content. An Internet resource is defined herein as a resource with a Uniform Resource Identifier (URI), including the Uniform Resource Locators (URL) that identify Web sites as well as specific Web pages. As with known HyperText Markup Language (HTML) META tags, the RDF description statements, encased as part of an Extensible Markup Language (XML) section, can be included within a Web page (HTML file), or can be in separate files.

In performing Web searches, users can input a word or short phrase to a search engine and obtain listing of sites containing the words, or phrase, or portions thereof. The listings can include titles and portions of text from the Web sites containing the search term(s). The titles and text portions provide the user with limited insight into the contextual framework of the Web sites in the listings. Further, the listings generally do not group the results in terms of context. In order to find those sites having meaningful results within the user's context the user can scan multiple pages of listings based only on the titles and short snippets of text from the sites. Current search engines also do not take advantage of the rich contextual information provided by RDF statements of Semantic Web sites.

SUMMARY

Methods and apparatus for searching Semantic Web structured resources and presenting the search results to a user can increase the likelihood that the search can produce meaningful results. A database can be constructed in the form of an index by parsing literal values from statements about resources to obtain component words of the literal values, with the index relating the component words to the statements from which they were parsed. A search engine can obtain component words from the database that match search terms in a query prepared by the user and can obtain the related statements for the matching words from the index. A servlet or other application can obtain predicates, instances, types of said instances, and full literal values of said instances for the related statements. The search results can be presented to the user as a summary of the predicates, instances, types, and full literal values.

In one embodiment, a method of obtaining search results can include parsing statements from at least one Semantic Web structured resource to identify component words, constructing an index from the component words, wherein the index relates the component words to the statements from which they were parsed, comparing the component words to a search term so as to identify matching words, identifying the statements related to the matching words based on the index, obtaining the predicates, instances, types of said instances, and full literal values of said instances for the related statements, and summarizing the results for presentation to a user.

The summaries can include counts and listings of the types, instances and values. The predicates, instances, types, and values can be arranged into graphical representations and grouped according to types and/or values. A web crawler or agent can identify Semantic Web structured resources on the network and gather statements from the identified resources. The gathered statements can be parsed to obtain their component words and the index can be constructed and/or updated based on the parsed gathered statements. The agent can iteratively identify resources and gather statements for parsing for updating the index.

In one embodiment, computer-readable medium can contain instructions for controlling a processor to construct a database by having a software agent visit sites on a network to identify Semantic Web structured resources and gather statements from the Semantic Web structured resources. The instructions can include instructions for parsing the statements to identify component words, constructing an index from the component words, which relates the component words to the statements, storing the index in a database on the computer-readable medium, and updating the database by iteratively performing the aforementioned visiting, gathering, parsing, constructing, and storing.

The computer-readable medium can include instructions for controlling the processor to obtain search results for a search query using the database by obtaining predicates, instances, types of instances, and literal values of the statements related to search terms of the query by the index, and summarizing the predicates, instances, types, and literal values for presentation to a user as the search results. The instructions can include instructions for controlling the processor to display the search results by arranging the predicates, instances, types, and literal values into one or more graphical representations, and grouping the graphical representations according to the types and/or the literal values.

In one embodiment, a system for obtaining search results for a query prepared by a user can include at least one parser for receiving statements from Semantic Web structured resources and identifying component words of the statements, a processor for constructing an index relating the component words to the statements from which they were parsed, a database for storing the index, a search engine for matching search terms of the query to the component words and identifying statements related to the matched words, a servlet for obtaining predicates, instances, types of instances, and full literal values of the instances for the identified statements, and an object viewer for summarizing the results for presentation to the user.

The object viewer can include means for arranging the predicates, instances, types, and literal values into one or more graphical representations, and means for grouping the graphical representations according to the types and/or the literal values. The system can include means for identifying Semantic Web structured resources to obtain identified Semantic Web structured resources, means for gathering statements from the identified Semantic Web structured resources to obtain gathered statements, means for presenting the gathered statements for parsing of the gathered statements, means for iteratively invoking the means for identifying, the means for gathering and the means for presenting, wherein the processor includes means for updating the index based on the parsing of the gathered statements.

In one embodiment, a computer program, disposed on a computer readable medium, can enable searching of and presentation of search results from Semantic Web structured resources. The computer program can include instructions for causing a processor to parse statements from at least one Semantic Web structured resource to identify component words, construct an index from the component words, wherein the index relates the component words to the statements from which they were parsed, compare the component words to a search term to identify matching words, identify related ones of the statements for the matching words based on the index, obtain predicates, instances, types of said instances, and values of said instances for the related statements, and summarize the predicates, instances, types, and full literal values for presentation to a user.

The computer program can include instructions to identify Semantic Web structured resources to obtain identified Semantic Web structured resources, gather statements from the identified Semantic Web structured resources to obtain gathered statements, present the gathered statements for parsing of the gathered statements, update the index based on the parsing of the gathered statements, and iteratively identify, gather and present. The instructions for causing a processor to summarize can include instructions to arrange the predicates, instances, types, and literal values into one or more graphical representations, and to group the graphical representations according to the types and/or the literal values.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
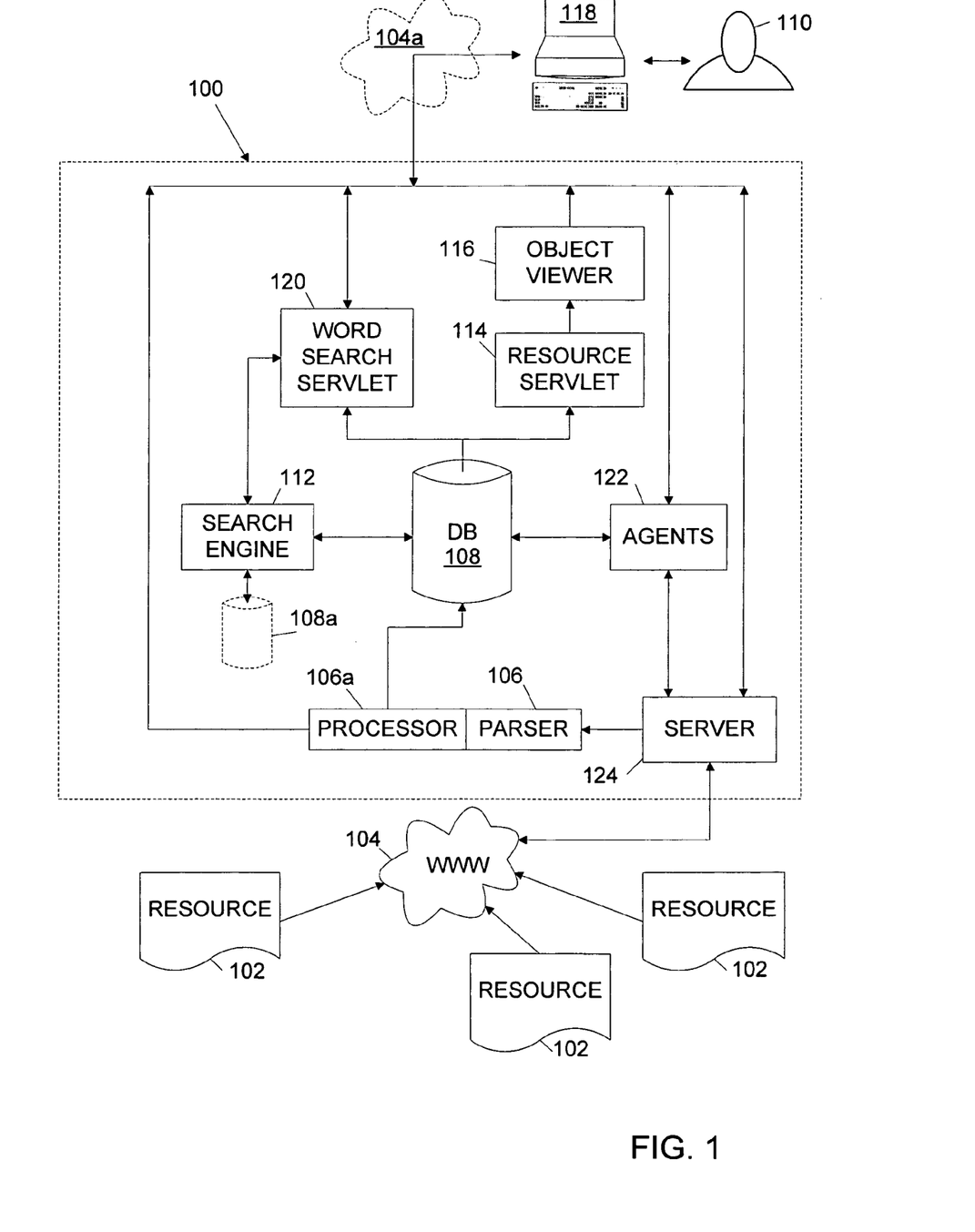
FIG. 1 illustrates a block diagram of a system architecture for focusing search results on the Semantic Web.

Referring to FIG. 1, the system 100 can access one or more Semantic Web resources 102 of the World Wide Web (WWW) 104, or other network-accessible information on a network such as the Internet. The resources 102 can include bodies of knowledge structured in accordance with the Resource Definition Framework (RDF) of the Semantic Web. Resources can include Web pages, part of a Web page, e.g. a specific HyperText Markup Language (HTML) or eXtensible Markup Language (XML) element within a source, a collection of pages, a Web site, or other RDF structured object. Parser 106 of system 100 can parse the RDF statements in the resources 102 and tokenize the literal values or words of the RDF statements. Database 108 can include an index from the tokenized words to the statements in which they appear. Parser 106 can include processor 106a for constructing and storing the index in database 108.

The user 110 can construct a search for one or more selected words, or search terms in the manner known for construction of searches on WWW 104. The user 110 can provide the search terms to servlet 120, which uses search engine 112 to locate the search words, or terms in the index of database 108 and identify the RDF statements in which the word(s) occurs. In one embodiment, database 108 can be a Statement Database and system 100 can include a Word Database 108a (shown in phantom) used by search engine 112. If a search involves multiple words, the results for the multiple words can be merged. Search servlet 120 can identify: the predicates, or named properties used in the statements, e.g. name, label, place, etc.; the instances, or subjects of the statements, e.g. the specific resources for the statements; and the types of the instances, or values of the properties. The value or object of a statement can be another resource or a literal value.

The search results can be summarized by search servlet 120, including summaries of the identified predicates, instances and types which can be presented to user 110 at user interface 118. User interface 118 can include a web browser running on a processor, such as a personal computer for use in accessing WWW 104. The summaries can include counts of the number of results for the various predicates, literal values matched, type specific information and/or relevance rankings. As an example, a search for the string "Columbia" using resources such as an online US Atlas, a space exploration web site and an online genealogical database can result in four instances of type City with predicate of name, one instance of type StateOrTerritory with predicate of name, one instance of type River with predicate of name, one instance of type SpaceShuttle with predicate of name and 10 instances of type BirthEvent with predicate of place. The results can be summarized as shown in Table 1.

| Count | Type | Predicate |
|-------|------|-----------|
| 4 | City | name |
| 1 | StateOrTerritory | name |
| 1 | River | name |
| 1 | SpaceShuttle | name |
| 10 | BirthEvent | place |

The summary can provide a quick reference for user 110 to narrow the search to those subjects of interest to user 110. By choosing one of the types from Table 1, the results that make up the summary can be displayed to user 110. If type City is chosen for example, system 100 can display the listing of cities named Columbia, as in Table 2:

| Type | Name |
|------|------|
| City | Columbia, SC |
| City | Columbia, MO |
| City | Columbia, TN |
| City | Columbia, IL |

Thus, it can be seen that system 100 can provide the user with a means of quickly narrowing the focus of a search on the Semantic Web.

In one embodiment a word search servlet 120 can provide a graphical representation of the results of the search to the user 110 rather than a tabular view. As in the case of the tabular view, the word search servlet 120 can identify the predicates, instances and types. However, the results can be grouped by instances, or resources, with the statements associated with objects matching the search terms related to the associated predicates. Resource servlet 114 and object viewer 116 can allow user 110 to view additional statements about a given resource identified by search servlet 120. Network 104a, agents 122, and server 124 are discussed hereinbelow and/or in connection with FIG. 3.

FIGS. 2A-2E illustrate graphical representations of the results of the above exemplary search. For the results of type City 202, shown in FIG. 2A, the four instances 204a-d can be identified as fragment identifiers "place----" with full literal values 206a-d. It can be understood that the instance identifiers shown in FIGS. 2A-2E can represent the local fragment portion of the absolute Uniform Resource Identifiers (URI) for the Semantic Web resources 102 used in the statements, which typically can be the Resources from which the statements were taken. For example, the full URI for "place2982" might be "http://www.example.org/locations#place2982", and instance 204b "place2982" can have a name with a literal value 206b "Columbia, Mo.". Similarly, the graphical representation for the StateOrTerritory class 208, FIG. 2B, the SpaceShuttle class 210, FIG. 2C, and the River class 212, FIG. 2D, can include the instance 214 "state37" with associated name literal 216 "District of Columbia", instance 218 "shuttle15" with name literal 220 "Columbia" and instance 222 "watershed286" with name literal 224 "Columbia", respectively.

Figure 2A:
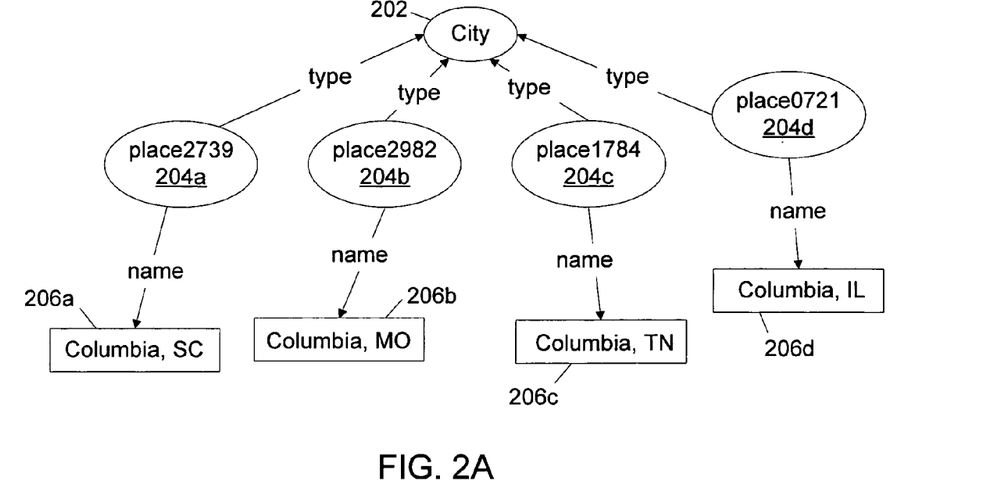
FIGS. 2A-2E illustrate graphical representations of search results.
Figure 2B:
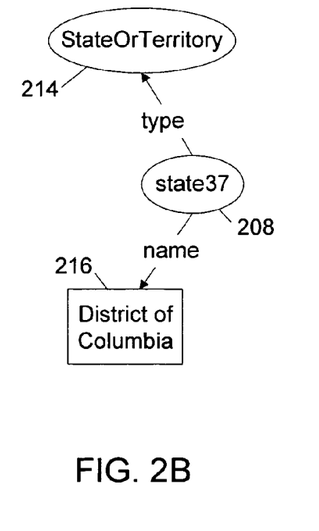
Figure 2C:
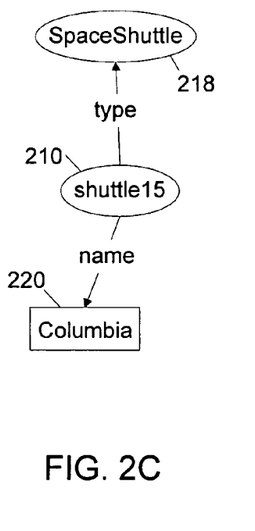
Figure 2D:
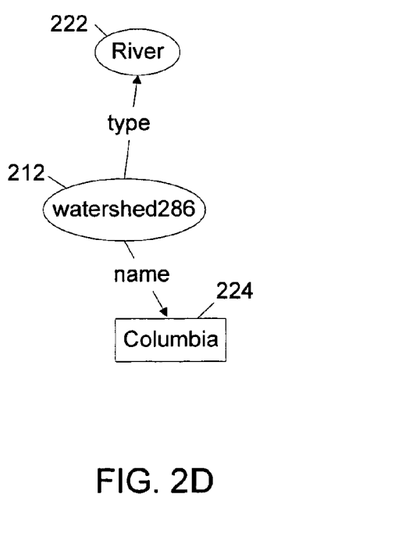
Figure 2E:
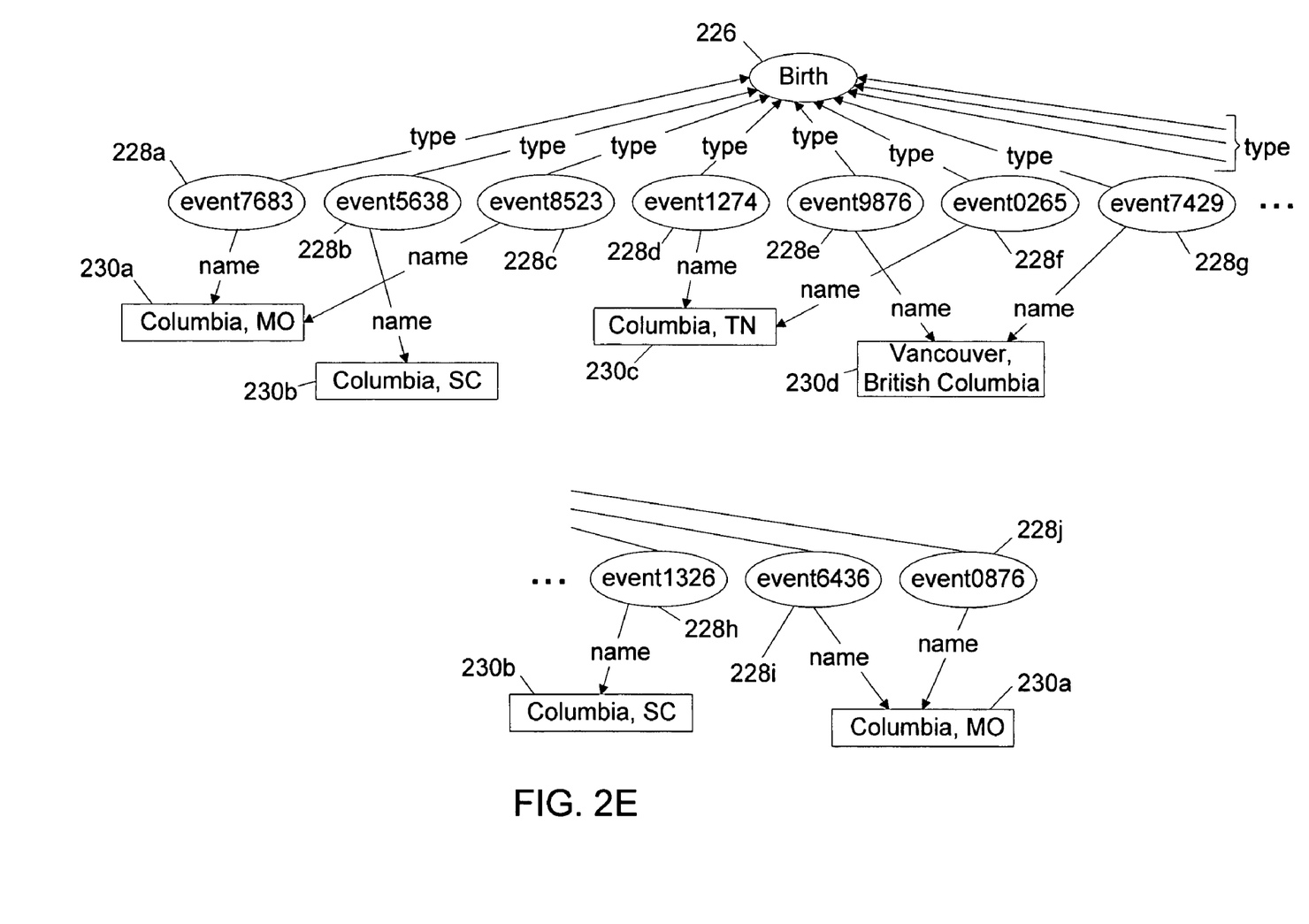

The graphical representation for the Birth class 226 in FIG. 2E can illustrate the instances 228a-j identified as "event----" with literal values 230a-d. For clarity, the illustration of Birth class 226 in FIG. 2E is separated into parts, though it can be understood that the display for user 110 can include scroll bars, as known in the art for graphical representations, such that the illustration of the Birth class 226 can be continuous. It can also be noted that the Birth class 226 and one or more of the associated literal values 230a-d can be repeated in the illustration of FIG. 2E to better show the connections.

Figure 2F:
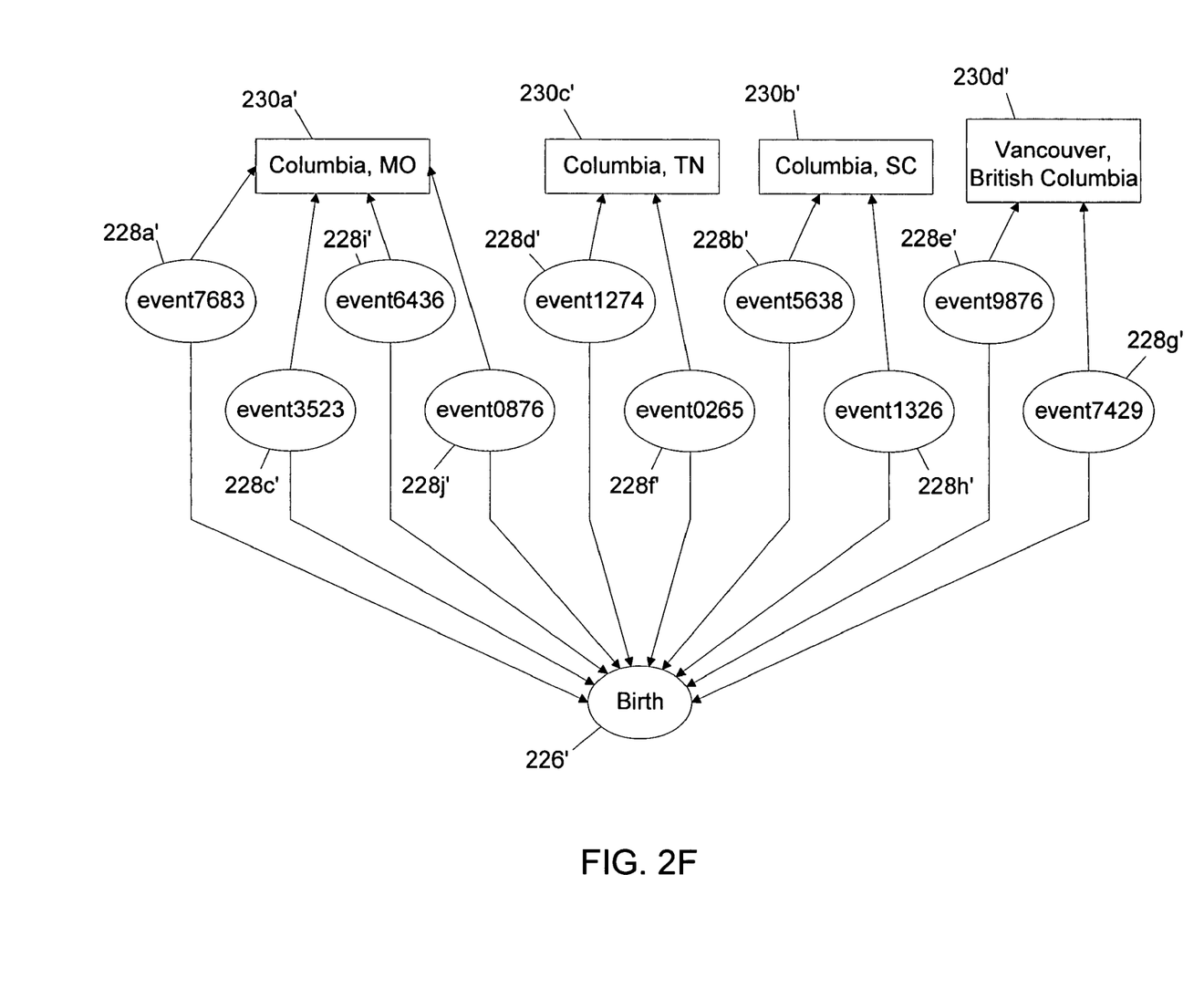
FIG. 2F illustrates an alternative graphical representation of a portion of the search results represented in FIGS. 2A-2E.

FIG. 2F illustrates an alternative graphical representation of the Birth class 226', wherein the instances 228a'-j' are grouped with the literal values 230a'-d'. It can be understood that the arrangement and/or placement of classes, instances, and/or literal values in the graphical representations provided by word search servlet 120 can be varied to accommodate the predicates, instances and types for the RDF statements identified by search engine 112. However, the arrangement and/or placement can be such that the user can identify the classes associated with a given result, the instances for a given class, and the properties and literal values associated with a given instance.

Figure 3:
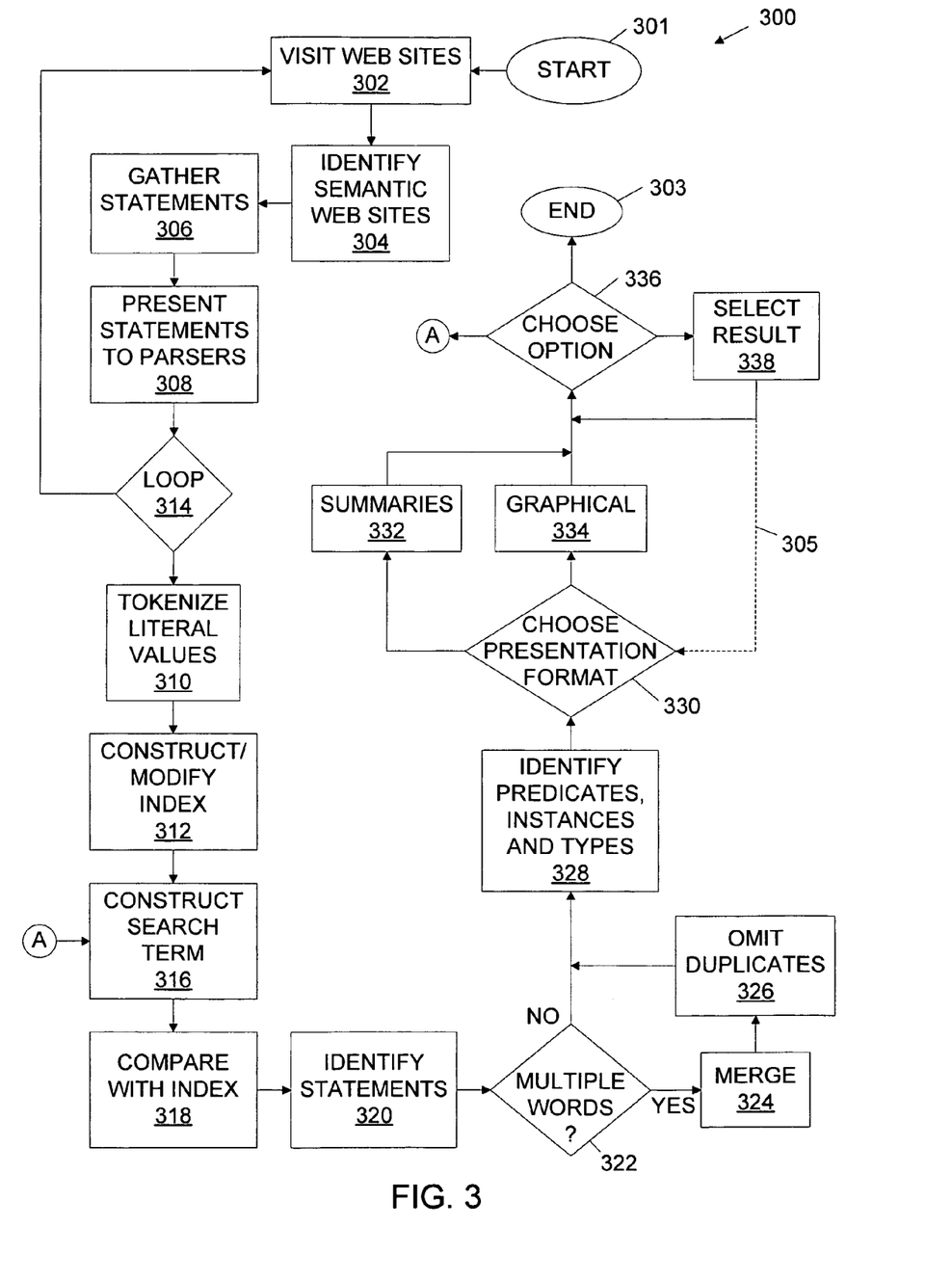
FIG. 3 illustrates a flow chart of a method implemented by the system architecture of FIG. 1.

Referring to FIG. 3, a flow chart can illustrate a method 300 of obtaining and presenting search results as implemented by the system 100 of FIG. 1. Known search engines can include web crawlers that can visit WWW 104 sites for creating entries for the search engine index. Typically however, the entries can be text based. The method 300 can start (301) with agents 122 of system 100, shown in FIG. 1, visiting (302) web sites. Agents 122 can include autonomous programs acting on behalf of user 110. Unlike the text-based entries from known web crawlers, agents 122 can include instructions for identifying (304) Semantic Web sites or resources 102 and for gathering (306) from the resources 102 bodies of statements to be used in searching. Agents 122 can present (308) the statements to parsers 106 and parsers 106 can tokenize (310) the literal values to identify their component words, as previously described.

Method 300 can construct and/or modify (312) the index for database 108 based on the statements obtained by agents 122. It can be understood that in constructing the index, the processors 106a of parsers 106 can discard articles, such as "the", "a" and "an", and other noise words and short numbers in the manner of known methods for constructing such indices. It can also be understood that agents 122 can periodically or continuously visit Semantic Web sites, gather statements and provide the statements to parsers 106, as shown by loop 314, such that parsers 106 can maintain database 108 updated. When the user constructs a search term for a given word or phrase, as at 316, method 300 can compare (318) the search term with the database 108 index to identify (320) the statements in which the search term occurs.

If a search involves multiple words, as determined at 322, the results for the words can be merged (324) and duplicates omitted (326). The predicates, instances and types for the identified statements can be determined (328) and the results can be presented to the user 110. The user 110 can specify at 330 whether the results can be presented as summaries (332), or as graphical representations (334), as previously described. The user 110 can then choose, at 336, to select a result for viewing (338), modify the search term or construct a new search term by returning to 316, as indicated at "A", or end method 300, as at 303. After selecting and reviewing a result at 338, method 300 can return user 110 to 336 for additional choices. Alternatively or optionally, user 110 can be returned to choose the results presentation format at 330, as indicated in phantom by arrow 305. By providing a choice of options at 336, the word search can provide a starting point for the user, wherein the user can browse the presentation and perform additional searches to find additional information.

By effectively using the architecture of the Semantic Web, the systems and methods described herein can provide a user with increased context for the results of a search. Thus, the systems and methods can focus the search results and guide the user to the instances or results of interest to the user. The systems and methods described herein may not be limited to a particular hardware or software configuration; they may find applicability in many communication environments. For example, system 100 can include a server 124 for connection to WWW 104, Internet, or other network. User 110 can access server 124 of system 100 through a web connection, as illustrated in phantom in FIG. 1 by network 104a. The methods and systems described herein can also be applied to non-web data that has been converted into Semantic Web format, e.g., data tables and/or database extracts.

In addition, the techniques described herein can be implemented in hardware or software, or a combination thereof. The systems and methods can be implemented in one or more computer programs executing on one or more programmable computers, such as may be exemplified by user interface 118 and/or server 124, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of obtaining search results, comprising:
   identifying, in a computing device that includes a processor and a memory, tagged statements in at least one Semantic Web structured resource, wherein the tagged statements each include subject/object/predicate triples;
   parsing the tagged statements from the at least one Semantic Web structured resource to identify component words;
   constructing an index from said component words, said index relating said component words to said tagged statements;
   comparing said component words to a search term to identify matching words;
   identifying related ones of said tagged statements for said matching words based on said index;
   obtaining predicates, instances, types of said instances, and literal values of said related ones of said tagged statements, wherein each of the predicates, instances, types of said instances, and literal values is found in at least one of the at least one Semantic Web Structured resources; and
   summarizing said obtained predicates, instances, types of said instances, and literal values for presentation to a user as summarized search results;
   receiving user input selecting a summarized subject of interest; and
   displaying a list of predicates associated with the selected summarized subject of interest.

2. The method of claim 1, wherein summarizing comprises:
   arranging said predicates, instances, types, and literal values into one or more graphical representations; and
   grouping said one or more graphical representations according to at least one of said types and said literal values.

3. The method of claim 1, comprising:
   identifying Semantic Web structured resources to obtain identified Semantic Web structured resources;
   gathering statements from said identified Semantic Web structured resources to obtain gathered statements;
   presenting said gathered statements for parsing of said gathered statements;
   wherein constructing an index comprises updating said index based on the parsing of said gathered statements; and
   wherein said identifying, gathering and presenting are iteratively performed.

4. The method of claim 3, wherein summarizing comprises:
   arranging said predicates, instances, types, and literal values into one or more graphical representations; and
   grouping said one or more graphical representations according to at least one of said types and said literal values.

5. A system for obtaining search results for a query prepared by a user, comprising:
   at least one parser identifying tagged statements in at least one Semantic Web structured resource, wherein the tagged statements each include subject/object/predicate triples, and receiving statements from Semantic Web structured resources and identifying component words of said statements;
   constructing an index from said component words, said index relating said component words to at least one of said tagged statements;
   a database for storing said index;
   a search engine for matching search terms of said query to said component words to obtain matched words, said search engine identifying said tagged statements related to said matched words;

a servlet for obtaining predicates, instances, types of said instances, and literal values of said tagged statements related to said matched words, wherein each of the predicates, instances, types of said instances, and literal values is found in at least one of the Semantic Web Structured resources; and an object viewer for summarizing said obtained predicates, instances, types of said instances, and literal values for presentation to said user as summarized search results, receiving user input selecting a summarized subject of interest, and displaying a list of predicates associated with the selected summarized subject of interest.

6. The system of claim 5, wherein said object viewer comprises:

means for arranging said predicates, instances, types, and literal values into one or more graphical representations; and means for grouping said one or more graphical representation according to at least one of said types and said literal.

7. The system of claim 5, comprising:

means for identifying Semantic Web structured resources to obtain identified Semantic Web structured resources;

means for gathering statements from said identified Semantic Web structured resources to obtain gathered statements;

means for presenting said gathered statements for parsing of said gathered statements;

means for iteratively invoking said means for identifying, said means for gathering and said means for presenting, and wherein said processor comprises means for updating said index based on the parsing of said gathered statements.

8. The system of claim 7, wherein said object viewer comprises:

means for arranging said predicates, instances, types, and literal values into one or more graphical representations; and means for grouping said graphical representations according to at least one of said types and said literal values.

9. A computer program, disposed on a computer readable medium, for enabling searching of and presentation of search results from Semantic Web structured resources, said computer program including instructions for causing a processor to:

identifying tagged statements in at least one Semantic Web structured resource, wherein the tagged statements each include subject/object/predicate triples;

parse said tagged statements from the at least one Semantic Web structured resource to identify component words;

construct an index from said component words, said index f said component words to said tagged statements;

compare said component words to a search term to identify matching words;

identify related ones of said tagged statements for said matching words based on said index;

obtain predicates, instances, types of said instances, and literal values of said related ones of said tagged statements, wherein each of the predicates, instances, types of said instances, and literal values is found in at least one of the at least one Semantic Web Structured resources; and summarize said obtained predicates, instances, types of said instances, and literal values for presentation to a user as summarized search results;

receiving user input selecting a summarized subject of interest; and displaying a list of predicates associated with the selected summarized subject of interest.

10. The computer program of claim 9, wherein said instructions for causing a processor to summarize further comprise instructions for causing a processor to:

arrange said predicates, instances, types, and literal values into one or more graphical representations; and group said one or more graphical representations according to at least one of said types and said literal values.

11. The computer program of claim 9, wherein said instructions further comprise instructions for causing a processor to:

identify Semantic Web structured resources to obtain identified Semantic Web structured resources;

gather statements from said identified Semantic Web structured resources to obtain gathered statements according to tags associated with each statement, wherein the tagged statements each include subject/object/predicate triples;

present said gathered statements for parsing of said gathered statements;

wherein said instructions for causing a processor to construct an index comprise instructions for causing a processor to update said index based on the parsing of said gathered statements; and wherein said instructions for causing a processor to identify, gather and present comprise instructions for causing a processor to iteratively identify, gather and present.

12. The computer program of claim 11, wherein said instructions for causing a processor to summarize further comprise instructions for causing a processor to:

arrange said predicates, instances, types, and literal values into one or more graphical representations; and group said graphical representations according to at least one of said types and said literal values.

13. A method, comprising:

identifying, in a computing device that includes a processor and a memory, tagged statements in a plurality of Semantic Web structured resources, wherein the tagged statements each include subject/object/predicate triples;

parsing the tagged statements from the Semantic Web structured resources to identify component words, wherein, for each Semantic Web structured resource, there are a plurality of tagged statements, and for each tagged statement there are a plurality of component words;

constructing a non-hierarchical index from said component words, said index relating said component words to said tagged statements;

comparing said component words to a search term to identify matching words;

identifying related ones of said tagged statements for said matching words based on said index;

obtaining predicates, instances, types of said instances, and literal values of said related ones of said statements, wherein each of the predicates, instances, types of said instances, and literal values is found in at least one of the at least one Semantic Web Structured resources; and summarizing said obtained predicates, instances, types of said instances, and literal values for presentation to a user as summarized search results;

receiving user input selecting a summarized subject of interest; and displaying a list of predicates associated with the selected summarized subject of interest.

14. The method of claim 13, wherein at least one of the Semantic Web structured resources has been converted from non-web data.

15. The method of claim 14, wherein the non-web data includes at least one of a database table and a database extract.

* * * * *